United States Patent Office 2,810,482
Patented Oct. 22, 1957

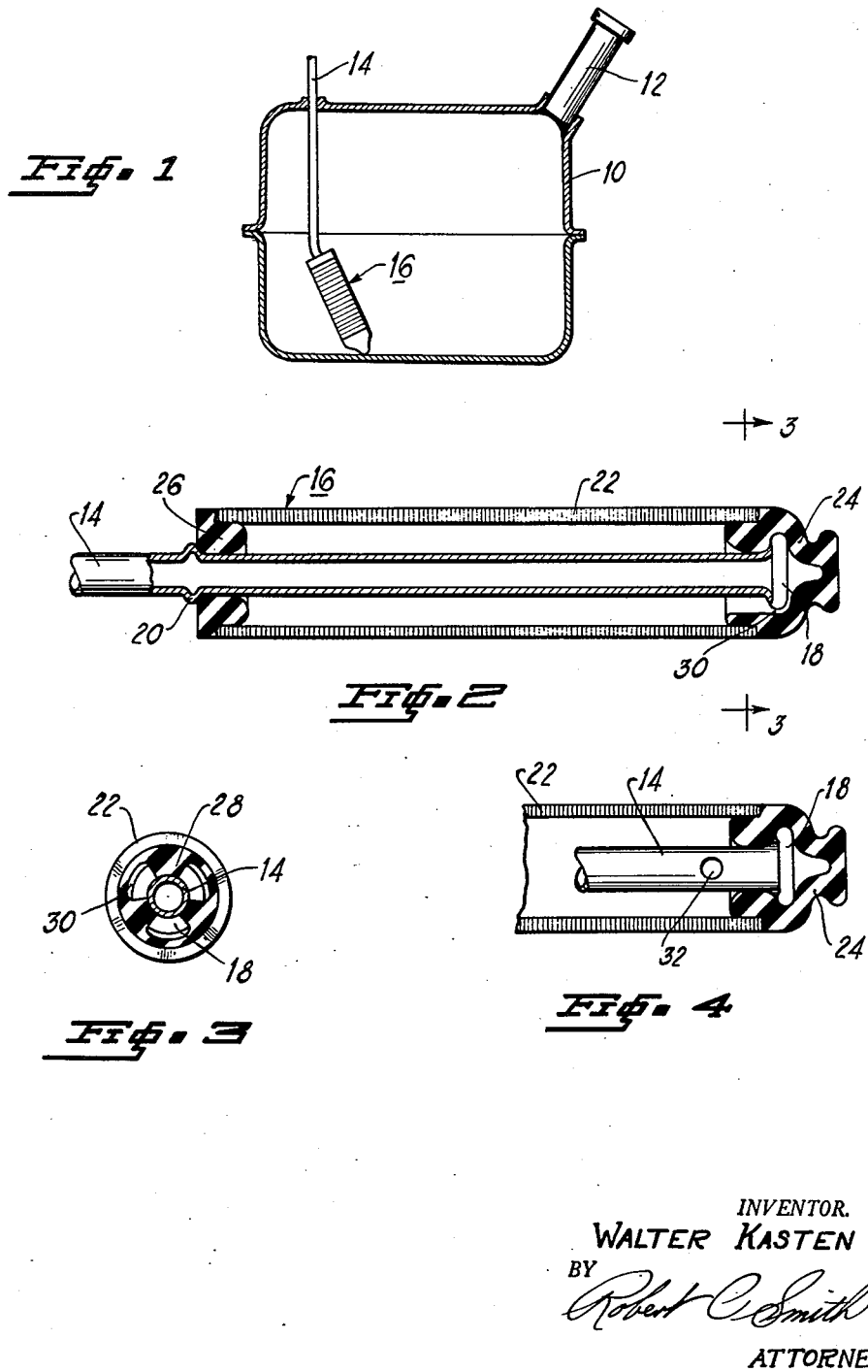

2,810,482

IMMERSION FUEL TANK FILTER

Walter Kasten, Royal Oak, Mich., assignor to Bendix Aviation Corporation, South Bend, Ind., a corporation of Delaware Application March 8, 1954, Serial No. 414,803

3 Claims. (Cl. 210—460)

This invention relates to filters and more particularly to a filter construction adapted to be immersed in the fuel contained in a tank, It has long been recognized that fuel tanks are a source of contaminants which plug or restrict fuel lines, and which may damage the engine with which they are associated. Various types of screens or filters have been used to combat this problem with varying degrees of success. It has, however, been difficult to design a filter construction which combines the desirable qualities of effective filtration, durability and low manufacturing cost. It is, therefore, an object of the present invention to provide a fuel tank filtering device having a higher degree of filtering efficiency than those customarily utilized for this purpose.

Another object of the invention is to provide a fuel tank filter which is very durable and long lived.

A further object is to provide a filter which can be kept sufficiently clean by the action of the immersing liquid to remain operable over a long period of time.

A further object of the present invention is to provide a filter which will effectively accomplish the above objects yet can be inexpensively produced.

Further objects and advantages will become apparent from the following description and accompanying drawings in which:

Figure 1 is a cross section of a fuel tank showing my filter in operative position.

Figure 2 is a cross sectional view of the filtering device itself showing the interrelation of the various parts.

Figure 3 is a section taken along line 3—3 of Figure 2.

Figure 4 is a cross sectional view of an alternate form of the invention.

With reference to Figure 1, numeral 10 designates a conventional fuel tank having a filler pipe 12 and a fuel outlet tube 14. The immersion type filter 16 is attached to the end of outlet tube 14 and may be mounted in any position which is found to be most effective for any particular application.

Referring now to Figure 2, this outlet tube 14 is crimped to form a flange 18 on the end and another flange 20 at a desired distance from the end corresponding approximately to the length of filter element which it is desired to employ. The filter element 22 is of the type known in the art as an edge-type filter and is usually composed either of helically wound strips or washer-like layers of crepe paper or other fibrous material which have been impregnated with a phenolic resin. After the element is wound or assembled to a desired length it is heated for a time and at a temperature sufficient to polymerize the resin thus forming a unit the fibers of which are impervious to the action of the fluid to be filtered. The element 22 is held in position on the end of the tube 14 by means of a molded endcap 24 and an annular grommet or endcap 26, which abut against flange 18 and 20 respectively. These endcaps are made of a flexible material such as synthetic rubber to provide for a certain amount of dimensional instability which is commonly experienced with the edge-type filter element.

From Figures 2 and 3 it will be seen that endcap 24 holds itself to the outlet tube 14 by means of projections or fingers 28 which grasp around flange 18. These projections have passages 30 between them which allow the fuel to enter the end of tube 14 from the hollow interior of element 22 where it passes out of the tank to the fuel pump. As the fuel passes through the interstices of element 22, any impurities are deposited on the surface of the element. Where used in vehicles, the continual sloshing action of the fuel tends to keep the element clean so that its effectiveness is not appreciably reduced over a long period of use.

Figure 4 shows a cross-sectional view of an alternate design which may be slightly less expensive to manufacture than the preferred form and is usable where it is not necessary to supply the fuel directly to the end of the outlet tube. In this design the flexible endcap 24 simply snaps over or grasps the outlet tube 14 behind flange 18 without any provision being made to provide a passage to the end of the tube. Communication between the interior of the filter element 22 and the interior of the tube is effected by means of a port 32 drilled in the sidewall of the outlet tube 14 as near to the end as is practicable. It will be observed that where the filter is to be used in a horizontal position on the floor of the tank this design offers no appreciable disadvantage as compared with the preferred form, but where the elements stand in a substantially vertical position, the port 32 being higher off the floor than the opening at the end of tube 14, the effective capacity of the tank is reduced somewhat.

Referring again to Figure 2, operation is initiated by a fuel pump (not shown) which creates a pressure differential between itself and, hence, the inside of outlet tube 14 and the fuel in the tank 10. Because of this pressure differential, the fuel flows through the pores or interstices of element 22, through the passages 30 formed between the fingers 28 of endcap 24, and into the outlet pipe 14. Operation of the device of Figure 4 is identical except that the fuel flows from the hollow interior of element 22 through port 32 to the inside of outlet pipe 14.

Various modifications are possible without departing from the scope of the invention. The form of the endcaps is dictated only by the necessity for performing the specified function and other details of design, shape, or size may be changed to suit requirements.

I claim:

1. A filtering device for use in a fuel tank comprising a tube for carrying fuel from said tank having a flange formed on the end thereof and a second flange formed thereon at a desired distance from the end of said tube, an edge-type filtering element positioned concentrically with respect to said tube, a flexible endcap which supports one end of said element and has projections which grasp said flange and cooperate with said tube to form passages providing communication between the interior of said filter element and the end of said outlet tube, and a flexible annular grommet abutting against said second flange and supporting the other end of said element.

2. A filtering device for use in a fuel tank comprising a tube for carrying fuel from said tank having a flange formed on the end thereof and a second flange formed thereon at a desired distance from the end of said tube, an edge-type filtering element positioned concentrically with respect to said tube, an endcap which supports one end of said element and has projections which grasp said flange and cooperate with said tube to form passages providing communication between the interior of said filter element and the end of said outlet tube, and an annular grommet abutting against said second flange and supporting the other end of said element.

3. A filtering device for use in a fuel tank comprising a tube for carrying fuel from said tank having a flange formed on the end thereof and a second flange formed thereon at a desired distance from the end of said tube, a filtering element surrounding said tube, said element being spaced between said flanges and away from said tube, an endcap which supports one end of said element and has projections which grasp said flange and cooperate with said tube to form passages providing communication between the interior of said filter element and the end of said outlet tube, and a second endcap abutting against said second flange and supporting the other end of said element.

References Cited in the file of this patent

UNITED STATES PATENTS

| | | |
|---|---|---|
| 1,218,848 | Foster | Mar. 13, 1917 |
| 1,378,929 | Wurscher | May 24, 1921 |
| 2,571,059 | Puschelberg et al. | Oct. 9, 1951 |
| 2,646,126 | Goodner | July 21, 1953 |
| 2,682,268 | Ryan et al. | June 29, 1954 |